Sept. 6, 1955     A. M. PETERSON     2,716,833

FISHING GEAR

Filed Jan. 25, 1954

*INVENTOR.*
ALDON M. PETERSON
BY *H. F. Woodward*
            *Atty.*

United States Patent Office 2,716,833
Patented Sept. 6, 1955

2,716,833

FISHING GEAR

Aldon M. Peterson, Wayzata, Minn.

Application January 25, 1954, Serial No. 405,698

4 Claims. (Cl. 43—44.88)

This invention relates to fishing gear, and more particularly to what is commonly termed "sinkers" utilized heretofore in submerging the tackle carried by the fishing line below the water level.

An object of the invention, generally speaking, is the provision of an improved device of this character adapted to be readily assembled with or removed from the fishing line and incorporating means for permitting movement of the device on the fishing line from adjacent the bait or lure at the end of the cast to a predetermined point on the line a distance back from the bait or lure.

For the purpose of this application there has been set forth certain particular structures, but it is to be understood that they are presented for illustrative purposes only and not to be accorded any interpretation such as might have the effect of limiting what is claimed as the invention short of its true and comprehensive scope in the art.

Heretofore when casting, particularly when using a light-weight lure, the distance of the cast was not always that desired. To increase the distance of the cast, weights were often secured on the fishing line but this, in many cases, resulted in snarling of the line and the leader. With this new invention added weight is given to light lures without the disadvantages of tangling or snarling the leader and the line.

Figure 3:
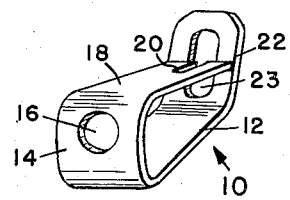
Figure 3 is a perspective view of the frame adapted to be mounted upon the fishing line.

Referring to the drawings in detail, the frame to be mounted upon the line is indicated generally at 10. This consists of a bottom or weight receiving arm portion 12 which is bent upward to form relative vertical end portion 14 which has a substantially circular hole therein. The material is then bent to form upper arm 18 and this arm is provided with an opening or notch 20 which may be of any suitable shape, such as rectangular. The line normally passes through the opening 20 when traveling up and down the fishing line or leader. The other end of the frame 10 is bent upward at an angle to the arm 12 and has elongated opening 23 therein. The opening 20 in the arm 18 is normally positioned as shown in Figure 3 but it is to be understood that the arm 18 may be adjusted to different positions in respect to the opening 23. The frame may be substantially quadrilateral in shape as shown in Figure 3.

Figure 2:
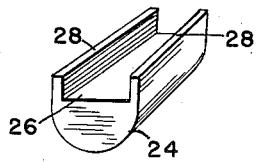
Figure 2 is a perspective view of a weight adapted to be clamped on the frame shown in Figure 3.

In Figure 2 is shown a weight which generally is of lead and may be of any desired shape. The body 24 is provided with a groove 26 and upwardly extending sidewalls 28. To secure this weight upon the frame, arm 12 is placed in the groove 26 and the sidewalls 28 are bent over and clamped to the arm 12.

Figure 1:
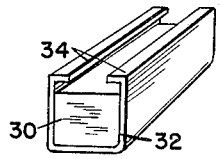
Figure 1 is a perspective view of a weight adapted to be clipped upon the line mounted frame shown in Figure 3.

In Figure 1 is shown a modified form of weight which includes shell 32 and suitable weight member 30 placed therein. The shell is provided with arms 34 which are adapted to be clamped on the arm 12 of the frame.

Figure 4:
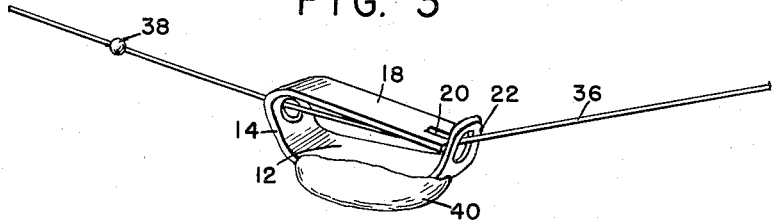
Figure 4 is a view of a frame mounted upon a line in which the weight is permanently attached to the frame.
Figure 5:
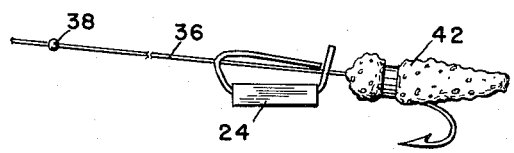
Figure 5 is a view of a fishing gear at or about the end of the cast.
Figure 6:
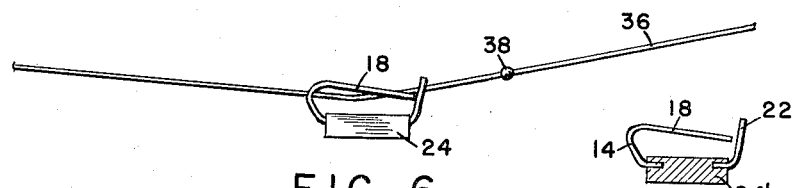
Figure 6 is a view of the invention showing the gear a short time after the cast has been completed.
Figure 7:
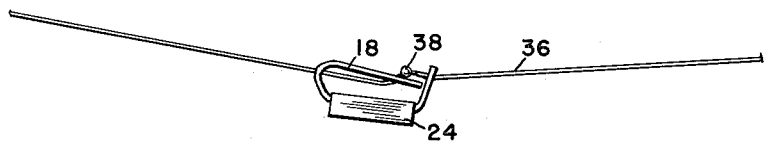
Figure 7 is a side view of the invention showing the gear locked in place on the fishing line.

In Figure 4 the invention is shown with the lead or weight 40 soldered or otherwise permanently secured to the arm 12 of the frame 10. The line 36 normally passes through the opening 20 in the upper arm 18 of the frame when sliding along the line. The distance from the lure that the obstruction 38 is placed is determined by the fisherman depending upon the depth and other conditions under which he desires to fish. The obstruction 38 must be of a size that freely passes through the openings 16 and 23. The obstruction may be a split shot, or any other suitable device. When a light lure is used, for example as shown in Figure 5, greater distance can be obtained when the weight is adjacent the lure during the cast. In Figure 5 is shown the position of the weight 24 at or about the time the lure strikes the surface of the water. The line 36 may or may not be in the opening 20 of the upper arm 12 at this time. As soon as the lure strikes the water, the weight 24 slides down the leader or line to positions shown in Figure 6. At this time the line passes through the opening 20 in the upper arm 18 and the obstruction 38 passes through the openings 16 and 23, and after the lure settles into the water and the weight 24 travels back down the line or leader, the obstruction assumes the locked position shown in Figure 7. The weight then stays in this position until released by the fisherman.

Figure 9:
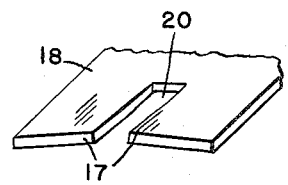
Figure 9 is an enlarged end view of the top arm 18 of the frame shown in Figure 3.

It is generally preferred that the end of the arm 18 having the opening 20 therein have the inner edges 17 at the outer ends of the opening 20 curve slightly upward as shown in Figure 9. This facilitates the passage of the obstruction 38 through the opening 23 when sliding down the line 36 and the passage of the line through the opening 20 when sliding up the line toward the lure and the locking of the obstruction 38 in the position shown in Figure 7.

Figure 8:
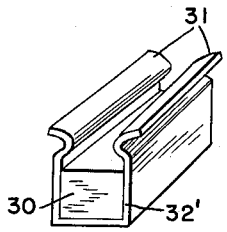
Figure 8 is a modified form of the weight adapted to be clipped upon the frame shown in Figure 3.

It is also desirable that the amount of weight added be varied depending upon conditions that the fisherman meets and this may be accomplished by having various size weights that can be clipped upon the arm 12 of the frame 10. In Figure 8 is shown one form of a weight that may be removably secured upon the arm. This modified form includes shell 32' with weight 30 mounted therein and spring clip arms 31.

Figure 10:
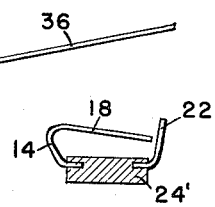
Figure 10 is a view of a modified form.

It is to be understood that the ends 14 and 22 may be imbedded in or otherwise secured to the weight member 24', as shown in Figure 10, thus eliminating the lower arm 12. Such arrangement is not preferred, but may reduce the cost of production. The end 14 with the arm 18 and the end 22 may be positioned in the mold and thus imbedded in the weight member when such member is formed.

What is claimed:

1. A slip-sinker for a fishing line comprising a carrier having a weight receiving arm, an end portion bent at an angle relative to the arm and provided with an opening having one axis greater than the other axis, a second end portion bent at an angle to the weight receiving arm and having a substantially circular opening therein, and a second arm extending from the second end portion and spaced above the weight receiving arm, said second arm being in non-parallel relationship to the weight receiving arm and provided with a notch which is positioned in close proximity to the opening in the first end portion, and a weight on the weight receiving arm.

2. A fishing sinker comprising a one piece frame of bendable material, said frame having an end portion having a non-circular opening therein, a weight supporting arm at substantially right angles to the end portion, a second end portion having a substantially circular opening and bent at an angle to the weight supporting arm, and a second arm extending from the second end portion in non-parallel relationship to the first arm, said second arm having a notch therein and positioned in close non-contacting relationship to the first end portion, and a weight on the weight receiving arm.

3. A fishing sinker comprising a one piece metal frame of quadrilateral shape, upright end portions thereof being provided with openings adapted to slideably engage a fishing line, and a weight secured to one side of the frame and the other side having a free end that terminates adjacent one of the upright end portions, the free end of the side being provided with a substantially rectangular notch.

4. A fishing sinker comprising an elongated one piece metal frame, said frame having a weight receiving arm, an end portion extending at an angle to the weight receiving arm, said end portion being provided with a non-circular opening, a second end portion extending at an angle from the weight receiving arm, said second end portion having a substantially circular opening therein, a second arm being a continuation of the second end portion and being spaced above the first arm, the second arm being in non-parallel relationship to the first arm and terminating adjacent the first end portion, said second arm having a notch therein, and a weight on the weight receiving arm.

References Cited in the file of this patent

UNITED STATES PATENTS

| | | |
|---|---|---|
| 399,866 | Gage | Mar. 19, 1889 |
| 829,608 | Stanton | Aug. 28, 1906 |
| 2,181,458 | La Gue | Nov. 28, 1939 |
| 2,217,972 | Smith | Oct. 15, 1940 |
| 2,592,967 | Snapps | Apr. 15, 1952 |

FOREIGN PATENTS

| | | |
|---|---|---|
| 1,025,257 | France | Jan. 21, 1953 |